(12) United States Patent
Möhlmann

(10) Patent No.: US 7,275,473 B2
(45) Date of Patent: Oct. 2, 2007

(54) HYDRAULIC CONTROL APPARATUS FOR A SHIFTING FORK IN A MANUAL TRANSMISSION

(75) Inventor: Reinhard Möhlmann, Köln (DE)

(73) Assignee: Getrag Ford Transmissions GmbH, Cologne (DE)

( * ) Notice: Subject to any disclaimer, the term of this patent is extended or adjusted under 35 U.S.C. 154(b) by 0 days.

(21) Appl. No.: 11/213,455

(22) Filed: Aug. 26, 2005

(65) Prior Publication Data
US 2006/0048643 A1 Mar. 9, 2006

(30) Foreign Application Priority Data
Sep. 8, 2004 (EP) .................... 04104330

(51) Int. Cl.
F15B 11/00 (2006.01)
(52) U.S. Cl. .......................... 91/536; 91/527
(58) Field of Classification Search .................. 91/526, 91/527, 536
See application file for complete search history.

(56) References Cited
U.S. PATENT DOCUMENTS
3,512,453 A * 5/1970 Balzer .................. 91/526
3,691,904 A * 9/1972 Pesci .................... 91/169
4,846,050 A   7/1989 Sibeud
2004/0123690 A1* 7/2004 Maisch et al. ............. 74/364

FOREIGN PATENT DOCUMENTS

| DE | 41 17 736 C1 | 5/1991 |
| DE | 42 08 060 A1 | 3/1992 |
| DE | 101 34 115 A1 | 7/2001 |
| DE | 101 49 527 A1 | 10/2001 |
| EP | 0 417 657 A1 | 3/1991 |
| GB | 2 163 224 A | 2/1996 |

* cited by examiner

Primary Examiner—Michael Leslie
(74) Attorney, Agent, or Firm—Schlee IP International, P.C.

(57) ABSTRACT

The invention relates to a hydraulic control apparatus (1) for a shifting fork (7) for engaging/releasing at least one gear (G) in a manual transmission, comprising at least one shifting cylinder (2, 3) and a piston unit (6) which can move within the shifting cylinder and is connected to the shifting fork (7), and at least one control valve (8) for generating a modeled pressure which can be applied to the piston unit (6) in order to actuate the shifting fork (7). To prevent jolting when the piston unit is started up, the invention proposes a valve apparatus which provides a counter-pressure which counteracts the movement of the piston unit (6). In a preferred exemplary embodiment, a diaphragm ensures that the counter-pressure drops below the value preset by the valve apparatus at low speeds on the part of the piston unit.

12 Claims, 1 Drawing Sheet

HYDRAULIC CONTROL APPARATUS FOR A SHIFTING FORK IN A MANUAL TRANSMISSION

Priority from the European Patent Application 04104330.8 is claimed, the content of which is herewith incorporated entirely by reference.

BACKGROUND OF THE INVENTION

The invention relates to a hydraulic control apparatus for a shifting fork for engaging/releasing at least one gear in a manual transmission.

By way of example, DE 101 34 115 A1 has disclosed a hydraulic control apparatus which comprises a double-acting shifting cylinder with two chambers, as well as a piston unit which guides the shifting fork. A control valve for generating a moderated pressure is connected upstream of the chambers. The piston unit and therefore the shifting fork can be displaced by applying the pressure of the control valve to one of the chambers. The volume of the chamber acted on by the pressure of the control valve increases, while the volume of the other chamber decreases and the oil which is present in the latter chamber passes into an oil sump.

One of the problems of the shifting cylinder described above is that the piston unit, during the transition from an at-rest position into a movement, jolts or does not start to move uniformly. This effect is attributable to the transition from static friction to sliding friction between the shifting cylinder and the piston unit. Since the coefficient of static friction is greater than the coefficient of sliding friction, a greater force is required to set the piston unit in motion than to overcome the sliding friction. Consequently, a high pressure initially has to be built up in one of the chambers in order to set the piston unit in motion. When the pressure required to start up the piston unit has been reached, therefore, the piston unit suddenly starts to move. Consequently, starting up the piston unit gently imposes high demands on the hydraulic control apparatus and/or on the control valve connected upstream of the chambers.

SUMMARY OF THE INVENTION

The invention is based on the object of providing a hydraulic control apparatus in which gentle starting-up of the piston unit is possible by relatively simple means.

The object on which the invention is based is achieved by virtue of the fact that a valve apparatus provides a counter-pressure which counteracts the movement which is caused by the application of the modeled pressure of the control valve to the piston unit. The counter-pressure prevents the piston unit from jolting at the transition from static friction to sliding friction, and allows the piston unit to be controlled better.

In a preferred exemplary embodiment, the shifting cylinder is designed as a double-acting shifting cylinder with two chambers, it being possible for the modeled pressure to be applied to in each case one chamber, while the counter-pressure for the other chamber is predetermined by the valve apparatus.

There is preferably a chamber selector valve which produces a connection between the control valve and one of the chambers while disconnecting the other chamber from the control valve. By switching the chamber selector valve, it is possible to apply targeted pressure to one chamber or the other, so that the movement of the piston unit can be controlled in two opposite directions, in each case against a counter-pressure.

The valve apparatus preferably presets a maximum value for the counter-pressure. It has proven expedient for the maximum value to be in a range from 0.25 to 3 bar. The maximum value is preferably from 0.5 to 1.5 bar.

The valve apparatus which provides the counter-pressure may have a ball seat valve with a spring-loaded ball. In the ball seat valve, the ball is pressed onto a valve seat by a spring force. When a defined pressure is exceeded, the ball is pressed out of the ball seat, with the result that the valve opens and a volumetric flow is permitted to flow between ball seat and ball. The desired value for the counter-pressure can be set by suitable selection of the ball seat valve, in particular of the spring or spring prestress.

In a preferred exemplary embodiment, a pressure relief apparatus is provided, by means of which the counter-pressure which counteracts the movement of the piston unit is made to drop below the value predetermined by the valve apparatus. Therefore, by means of the pressure relief apparatus it is possible to reduce the pressure in the chamber that is disconnected from the control valve at least within limits, even though a constant value for the counter-pressure is determined by, for example, the use of a spring-loaded ball seat valve.

The pressure relief apparatus is preferably designed in such a manner that the counter-pressure drops below the value predetermined by the valve apparatus at relatively low speeds on the part of the piston unit. Designing the pressure relief apparatus in this way takes account of the fact that when engaging a gear the shifting fork is moved at a relatively high speed but with a low actuating force out of a neutral position until it reaches the synchronization point or region, then the synchronization is carried out with a high actuating force and at a virtually negligible actuating speed, and finally, after synchronous running has been achieved, a claw clutch of the gearshift clutch is closed at a moderate actuating speed and a low actuating force. In the phase in which the actuating force is highest, therefore, the speed of the piston unit is virtually equal to zero, so that the pressure relief apparatus causes the pressure in the chamber that is disconnected from the control valve to drop below the preset value. Consequently, the pressure which is present in the chamber connected to the control valve can be utilized to a greater extent for the synchronization, which means that the maximum pressure which has to be provided by the control valve is lower than in the case of an exemplary embodiment in which the counter-pressure is not reduced.

The pressure relief apparatus preferably includes a diaphragm. The diaphragm permits a certain volumetric flow, with the result that the pressure in the chamber drops with a virtually unchanged volume or only a slight change in volume of the chamber.

Therefore, the pressure relief apparatus merely leads to a considerable reduction in pressure when the speed of the piston unit is relatively slow. In addition, it should be noted that the pressure relief apparatus may also be realized by a suitable selection of piston unit and shifting cylinder or of the sealing means arranged between them. In this case, a leak between a cylinder wall of the shifting cylinder and the piston unit would likewise lead to pressure relief when the piston speed of the piston unit is relatively slow and even a low volumetric flow is sufficient to reduce the pressure.

The control apparatus may have a further shifting cylinder for a further shifting fork, in which case a cylinder selection valve is expediently provided, which can be used to produce a connection between control valve and one of the shifting cylinders while disconnecting the other shifting cylinder from the control valve. A cylinder selection valve of this type allows two shifting cylinders or more shifting cylinders to continue to be actuated by just one control valve. It is also possible for a further selection valve to be connected upstream of the cylinder selection valve, in order for a plurality of shifting cylinders, for example four shifting cylinders, to be actuated by just one control valve.

It is preferable for both chambers of the shifting cylinder that is disconnected from the control valve to be connected to the valve apparatus, so that when one chamber of the shifting cylinder connected to the control valve is being acted on, all the other chambers are connected to the valve apparatus. An arrangement of this type ensures that all the shifting cylinders are always full of oil and cannot take up any air.

DETAILED DESCRIPTION OF THE DRAWINGS

Figure 1:
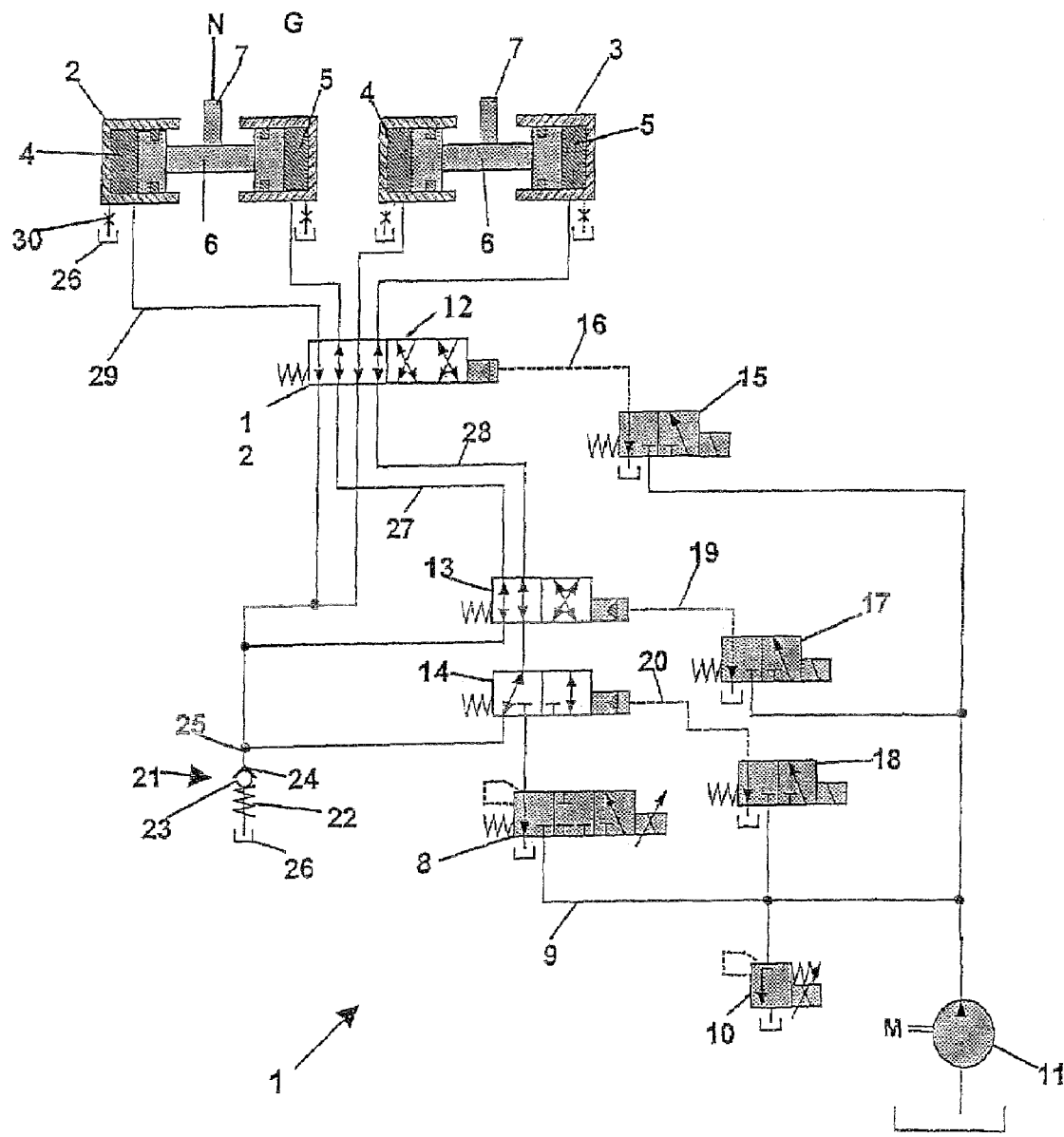
FIG. 1 schematically shows an exemplary embodiment of the hydraulic control apparatus according to invention.

The invention is explained in more detail on the basis of an exemplary embodiment shown in FIG. 1.

FIG. 1 shows a hydraulic shifting apparatus, which is denoted overall by 1. The hydraulic shifting apparatus 1 comprises a first shifting cylinder (or shifting actuator) 2 and a second shifting cylinder 3. Each of the two shifting cylinders 2, 3 is designed as a double-acting shifting cylinder having a first chamber 4 and a second chamber 5. A piston unit 6 is arranged between the first chamber 4 and the second chamber 5. A shifting fork 7, which is only diagrammatically indicated in FIG. 1, is connected to the piston unit 6.

The piston unit 6 with the shifting fork 7 can be actuated in a shifting cylinder 2, 3 by pressure being applied to either the first chamber 4 or the second chamber 5. If, for example, pressure is applied to the second chamber 5 of the second shifting cylinder 3, the associated piston unit 6 moves to the left, in the demonstration presented in FIG. 1, with the result that the volume of the associated first chamber 4 is reduced. In the process, the oil which is present in this chamber is forced out.

A control valve 8 designed as a pressure regulator is provided for acting on the individual chambers 4, 5 in a controlled way. On the inlet side, the pressure regulator 8 is connected via a line 9 to a main pressure regulator 10 and an engine-driven oil pump 11.

A chamber selector valve 12, a cylinder selector valve 13 and an activation valve 14 are connected between the chambers 4, 5 of the shifting cylinders 2, 3 and the pressure regulator 8. FIG. 1 shows each of the valves 12, 13, 14 in their spring-loaded at-rest position. The chamber selector valve 12 is assigned a pilot switching valve 15, which is electromagnetically actuable and in the excited position applies a control pressure to the chamber selector valve 12 via the signal line 16. The control pressure which is then applied causes the chamber selector valve 12 to switch from the at-rest position into a second position. In a similar way, a pilot switching valve 17 is assigned to the cylinder selector valve 13, and a pilot switching valve 18 is assigned to the activation valve 14, and these pilot switching valves are connected to the respective valves 13, 14 via respective signal lines 19, 20. Like the chamber selector valve 12, the cylinder selector valve 13 and the activation valve 14 can be switched into a respective second position by a suitable control pressure.

Furthermore, a valve apparatus having a ball seat valve 21 is provided in the control apparatus 1. At the ball seat valve 21, a spring 22 presses a ball 23 onto a ball seat 24, thereby closing the ball seat valve 21. Above a certain pressure at the valve inlet 25, the ball 23 is pressed out of the ball seat counter to the force of the spring 22. The ball seat valve 21 opens and permits a flow between the valve inlet 25 and an oil sump 26.

The valve inlet 25 of the ball seat valve can be connected to the chambers 4, 5 of both shifting cylinders 2, 3 via the chamber selector valve 12, the cylinder selector valve 13, the activation valve 14 and a line system comprising a plurality of lines. In the switching state shown in FIG. 1, all the chambers 2, 3 are connected to the valve inlet of the ball seat valve 21, so that a flow of oil out of one of these chambers through the ball seat valve 21 into the oil sump 26 is only possible when the corresponding chamber pressure is greater than the pressure by which the ball 23 is pressed into its ball seat 24. This switching state ensures that the individual chambers are filled with oil even when the shifting cylinders are not in use, so that the chambers cannot take up any air.

In order, for example, to connect the first chamber 4 of the first shifting cylinder 2 to the pressure regulator 8, in order to actuate the associated piston unit 6 and thereby to engage a gear G via the shifting fork 7, the activation valve 14 is moved into its second position, so that first of all a connection is produced between cylinder selector valve 13 and pressure regulator 8. Moreover, in the second position of the activation valve 14, a connection between ball seat valve 21 and cylinder selector valve 13 via the activation valve 14 is disconnected.

Furthermore, the cylinder selector valve 13 is switched out of its at-rest position, so that the modeled pressure of the pressure regulator 8 is applied to a line 27. This line 27, in addition to a line 28, connects the cylinder selector valve 13 to the chamber selector valve 12. In order, finally, to connect the line 27 to a line 29 which leads from the chamber selector valve 12 to the first chamber 4 of the first shifting cylinder 2, the chamber selector valve 12 has to be switched into its second position. This produces a connection between the corresponding chamber and the pressure regulator 8, so that the chamber can be filled with oil and the piston unit moves correspondingly to the right in the illustration shown in FIG. 1. Despite the switching operations which have been carried out, all the other chambers remain connected to the ball seat valve 21. The same also applies to the second chamber 5 of the first shifting cylinder 2, so that a certain counter-pressure opposes the movement of the piston unit 6.

The first and second chambers 4, 5 of each shifting cylinder 2, 3 are each assigned a pressure relief apparatus which includes a diaphragm 30. The diaphragm 30 permits a low volumetric flow between a chamber and the oil sump 26.

When the gear G is being engaged by the first shifting cylinder 2, the shifting fork 7 is initially moved out of a neutral position N, illustrated in FIG. 1, at a high speed to a synchronization point or region, which requires only a small amount of actuating force. In the synchronization region, on the other hand, a high actuating force is required with the piston unit 7 virtually stationary. After the synchronization, i.e. after the synchronization range has been passed through, the shifting fork is moved again at a high speed but once again at a low actuating force until a gearshift clutch assigned to the gear G has been completely closed.

Therefore, when shifting the gear G, a pressure has to be built up in the first chamber 4 of the first shifting cylinder 2, and consequently a force has to be generated in this chamber so as to overcome the static friction between piston unit 6 and shifting cylinder 2, to compensate for the counter-pressure in the second chamber 5 and to provide the required actuating force for the shifting fork 7. When the piston unit 6 starts to move, the friction which has to be overcome drops from the static friction to a lower sliding friction, with the result that the total force or pressure which has to be provided in the first chamber suddenly drops. However, the counter-pressure which continues to be present prevents the piston unit from jolting at the transition from static friction to sliding friction and allows the movement of the piston unit to be controlled more successfully.

A high actuating force is required in the synchronization range. Since the speed of the piston unit 6 is very low or zero in this synchronization range, the pressure prevailing in the second chamber 5 can be reduced via the diaphragm 30 while keeping the volume of the second chamber 5 virtually the same. The (counter-)pressure in this case drops well below the pressure predetermined by the ball seat valve 21, so that the pressure of the control valve 8, apart from the friction, can in this phase be used exclusively to provide a high actuating force. Therefore, despite the counter-pressure which has been set, it is not necessary to increase the maximum value for the modeled pressure to account for the required actuating force during the synchronization.

LIST OF DESIGNATIONS

1 Hydraulic switching apparatus
2 First shifting cylinder
3 Second shifting cylinder
4 First chamber
5 Second chamber
6 Piston unit
7 Shifting fork
8 Control valve
9 Line
10 Main pressure regulator
11 Pump
12 Chamber selector valve
13 Cylinder selector valve
14 Activation valve
15 Pilot switching valve
16 Control line
17 Pilot switching valve
18 Pilot switching valve
19 Signal line
20 Signal line
21 Ball seat valve
22 Spring
23 Ball
24 Ball seat
25 Valve inlet
26 Oil sump
27 Line
28 Line
29 Line
30 Diaphragm
G Gear
N Neutral position

The invention claimed is:

1. A hydraulic control apparatus for a shifting fork for engaging/releasing at least one gear in a manual transmission, comprising:
    at least one shifting cylinder and a piston unit which can move within the shifting cylinder and is connected to the shifting fork;
    at least one control valve for generating a modeled pressure which can be applied to the piston unit in order to actuate the shifting forks;
    a valve apparatus providing a counter-pressure which counteracts the movement of the piston unit.

2. The control apparatus as claimed in claim 1, wherein a chamber selector valve that is part of the means for the modeled pressure to be applied to one chamber is provided, wherein the chamber selector valve can establish a connection between the control valve and one of the chambers while disconnecting the other chamber from the control valve.

3. The control apparatus as claimed in claim 1, wherein the valve apparatus presets a maximum value for the counter-pressure.

4. The control apparatus as claimed in claim 3, wherein the maximum value for the counter-pressure is in the range of 0.25 to 3 bar.

5. The control apparatus as claimed in claim 4, wherein the maximum value for the counter-pressure is in the range of 0.5 to 1.5 bar.

6. The control apparatus as claimed in claim 1, wherein the valve apparatus has a ball seat valve with spring-loaded ball.

7. The control apparatus as claimed in claim 1, wherein a pressure relief apparatus is provided, by means the counter-pressure which counteracts the movement of the piston unit is made to drop below the value predetermined by the valve apparatus.

8. The control apparatus as claimed in claim 7, wherein the pressure relief apparatus causes the counter-pressure to drop below the value predetermined by the valve apparatus.

9. The control apparatus as claimed in claim 8, wherein the pressure relief apparatus causes the counter-pressure to drop below the value predetermined by the valve apparatus only when the piston unit has come to a complete stop.

10. The control apparatus as claimed in claim 7, wherein the pressure relief apparatus has at least one diaphragm.

11. The control apparatus as claimed in claim 1, wherein a further shifting cylinder is provided for a further shifting fork and a cylinder selector valve, which can be used to produce a connection between control valve and one of the shifting cylinders while disconnecting the other shifting cylinder from the control valve.

12. The control apparatus as claimed in claim 1, wherein the two chambers of the shifting cylinder are connected to the valve apparatus when the shifting cylinder is disconnected from the control valve.

* * * * *

UNITED STATES PATENT AND TRADEMARK OFFICE
CERTIFICATE OF CORRECTION

PATENT NO. : 7,275,473 B2
APPLICATION NO. : 11/213455
DATED : October 2, 2007
INVENTOR(S) : Reinhard Möhlmann It is certified that error appears in the above-identified patent and that said Letters Patent is hereby corrected as shown below:

| Column | Line | | Correct to Read |
|---|---|---|---|
| 6 | 12 | to actuate the shifting forks; | to actuate the shifting fork; |
| 6 | 14 | counteracts the movement of the piston unit. | counteracts the movement of the piston unit wherein the shifting cylinder is designed as a double-acting shifting cylinder with two chambers; and means for the modeled pressure to be applied to one chamber, while the valve apparatus presets the counter-pressure for the other chamber. |
| 6 | 35 | pressure relief apparatus is provided, by means the counter- | pressure relief apparatus is provided, by means of which the counter- |

Signed and Sealed this

Sixth Day of July, 2010

David J. Kappos
*Director of the United States Patent and Trademark Office*